United States Patent [19]

Monaco

[11] Patent Number: 4,888,942
[45] Date of Patent: Dec. 26, 1989

[54] LABOR SAVING LAWN IMPLEMENT

[76] Inventor: Anthony Monaco, 7320 Liberty Rd., Solon, Ohio 44139

[21] Appl. No.: 195,515

[22] Filed: May 18, 1988

[51] Int. Cl.[4] ............................................. A01D 11/00
[52] U.S. Cl. ............................... 56/400.01; 56/400.17; 15/245
[58] Field of Search ........... 56/400.01, 400.04, 400.05, 56/400.17; D. 8/13; 172/371; 15/245

[56] References Cited

U.S. PATENT DOCUMENTS

| | | | |
|---|---|---|---|
| 2,637,261 | 5/1953 | Wale | 56/400.05 |
| 2,728,099 | 12/1955 | Cocoo | 15/245 |
| 3,397,469 | 8/1968 | Browning | 56/400.04 |
| 4,317,250 | 3/1982 | Shutts | 15/245 |
| 4,467,490 | 8/1984 | Adams | 15/245 |
| 4,644,740 | 2/1987 | Lee | 56/400.04 |

FOREIGN PATENT DOCUMENTS

| | | | |
|---|---|---|---|
| 504749 | 7/1930 | Fed. Rep. of Germany | 56/400.01 |
| 1122173 | 9/1956 | France | 56/400.01 |
| 1479767 | 7/1977 | United Kingdom | 56/400.01 |

Primary Examiner—John Weiss
Attorney, Agent, or Firm—James H. Tilberry

[57] ABSTRACT

A yard implement is provided for working piles of fallen leaves. The implement is a device for pushing leaves under conditions which normally would require raking and/or blowing. A pusher blade is attached to a handle, and the blade is configured to maximize the mass of leaves that can be moved and to minimize the pushing effort required to move a given mass of leaves.

11 Claims, 2 Drawing Sheets

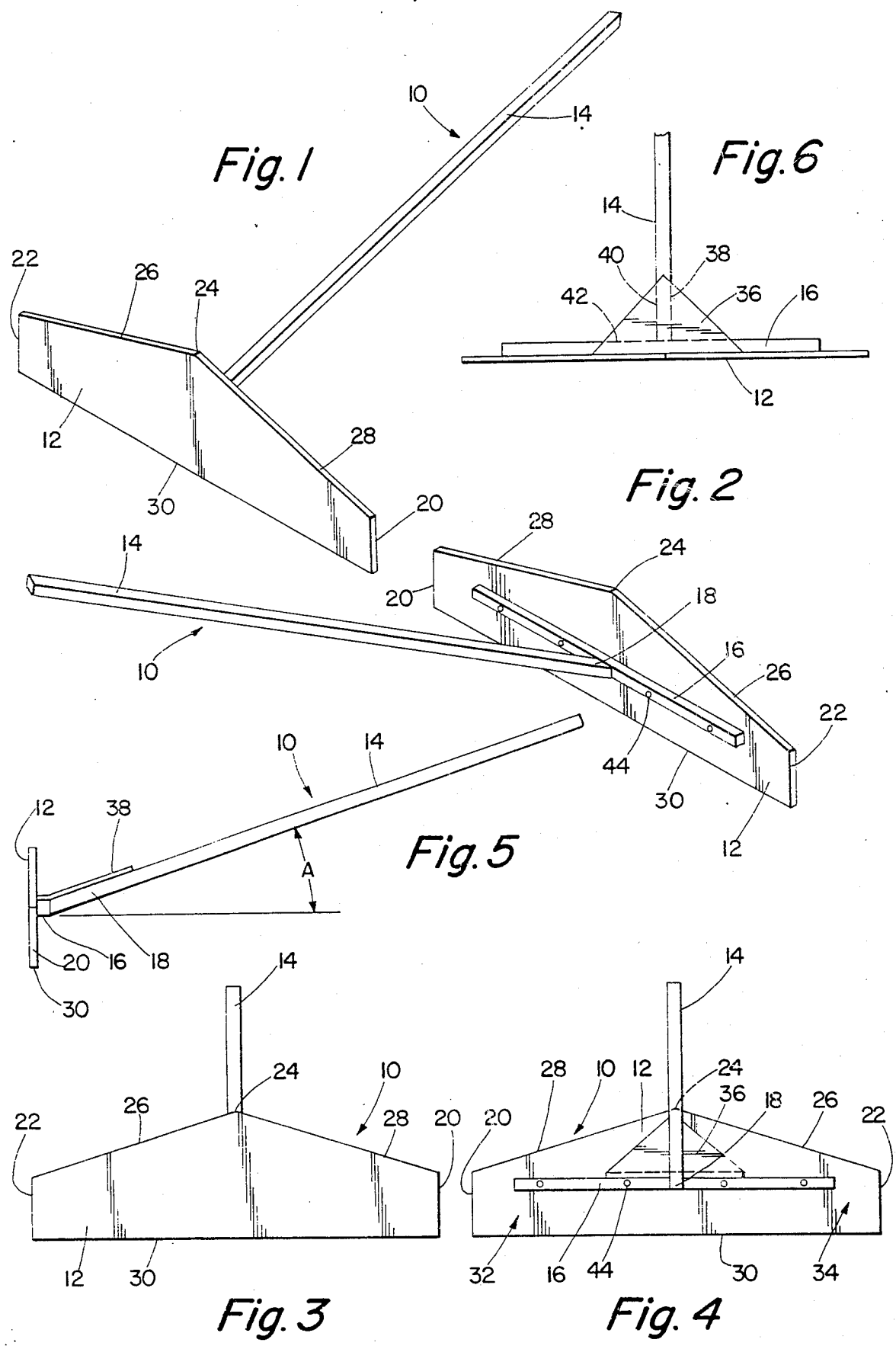

4,888,942

LABOR SAVING LAWN IMPLEMENT

INTRODUCTION

The universally utilized hand tool for managing fallen tree leaves has been the leaf rake. This rake is lightweight and is provided with flexible steel or bamboo tines projecting downward in a fan-shaped array from the base of the rake handle. Raking leaves with a leaf rake is a slow process and a tiring one, because the user primarily utilizes arm and chest muscles in an off balance position. This in turn places undue stress on the user's back. The handle of the rake tends to develop blisters between the thumb and forefinger of at least one, and sometimes both, hands of the user. Raking leaves is, therefore, not only tiring and time-consuming, but also can be painful, and the physical after-effects on the user may linger for days or weeks.

The wind rake, or leaf blower, was developed to minimize the arduous task of raking leaves. The wind rake is essentially a motor-driven blower which blows leaves into piles. It also has several disadvantages. First of all, it is expensive, costing hundreds of dollars. If leaves are abundant, a wind rake tends to work the leaves into unmanageable leaf banks or walls which resist further piling. Leaf rakes must then be resorted to in order to break up the leaf banks. The task of breaking up leaf banks, when leaves are piled high, is extremely difficult. Further, wind rakes are of little or no use when the leaves are wet. Thus the two implements most generally used for processing fallen leaves and removing them from lawns have serious limitations.

The problem of raking leaves is difficult enough for the homeowner, but for professional landscapers, the problem is worse. Facing the enormity of the task of dealing with vast quantities of fallen leaves, they have sometimes turned to the use of another tool, unintended for the purpose, in an attempt to cope with the problem: the professional grading rake, inverted. That tool, with a tine span of three or more feet, intended for grading dirt, when inverted, enables the worker to push rather than pull, quantities of leaves. This application is preferable to the use of the lightweight leaf rake in one major respect. Raking, that is, pulling the leaves toward the user with the leaf rake, does not take advantage of the weight and strength of the upper body, whereas pushing with the legs permits the worker to lean into the load and to apply the weight of the upper body. If there is a choice when performing manual labor, it is preferable and more efficient to use leg muscles instead of arm muscles because of the greater strength and endurance of the muscles of the legs. The worker who can push quantities of leaves, rather than pull them, does not tire so easily and does not suffer the backpain so often associated with raking. But professional grading rakes are expensive, and since they are commonly made of aluminum, under the stress of pushing heavy loads of leaves, they usually break after a relatively few hours of use at this unintended application. Further, the professional grading rake, inverted, tends to pivot about the point of an overload, thereby causing the rake to drift from the intended straight-ahead path. The result is that the worker expends unnecessary energy to offset the off-center load.

Being cognizant of these facts from his professional experience in the lawn care business, the inventor gave serious consideration to the problems of leaf control and to how these problems might be solved. His solution is the development of a labor-saving lawn implement which, like the inverted professional grading rake, takes advantage of leg and upper body strength and weight in moving large quantities of leaves over large areas of ground surface. However, unlike the professional grading rake which must be inverted for this purpose, the subject invention maximizes the efficiency of the pushing effort so that maximum quantities of leaves can be moved with a minimal amount of effort. The subject invention evolved from dissatisfaction with available known implements for use in the professional care of lawns.

BRIEF DESCRIPTION OF THE INVENTION

Essentially, the inventive device comprises a blade with a planar surface which is pushed over a lawn by means of an elongated handle secured to the backside of the blade. The invention is not intended to gather leaves into piles, in the manner in which leaf rakes are used, but rather, the invention is intended to move leaves after they have been gathered into piles. In operation, a workman grips the pushing handle along its length at a position and angle most efficient and comfortable for him in view of his height, weight, and muscular development. He then walks forward, pushing the blade on the ground as he advances, pushing a pile of leaves in front of the blade.

The inventor discovered from experimentation with a rectangular blade small enough to be pushed without excessive effort that leaves tended to build up in front of the blade and then to overflow excessively rearward over the top edge of the blade. By increasing the height of the rectangular blade until leaf overflow no longer occurred, the inventor found that so many leaves accumulated in front of the blade that the leaves became very difficult to move. By further experimentation, he found that a blade designed high in the center but inclined toward either side has greater efficiency when pushing extremely large piles of leaves. Leaves that pile up first in the center gradually fall to the side of the blade, thus keeping the weight of a large load of leaves centered in the middle of the blade, making it easier to push and keep in a straight line rather than off to the right or left, as with the inverted rake or with a rectangular blade. Refining this concept, the problem of overflow has been curtailed to an acceptable minimum when the top edge of the blade has an apex at the vertical midsection of the blade with its two top edges inclining toward the outboard ends. The most efficient blade is so proportioned that the apex is substantially twice the height of the outboard ends and when the height of the apex is substantially thirty percent of the length of the longitudinal bottom edge. In a preferred embodiment of the invention, the blade is made of polyolefin plastic sheet having a thickness substantially within the range of one-quarter inch to one-half inch. The maximum height of the blade at its vertical center line is within the range of 9 to 16 inches when the horizontal length of the blade is within the range of 36 to 48 inches. When the maximum height of the blade at its vertical centerline is substantially 12 inches, the preferred longitudinal length of the blade is 42 inches. With this configuration, a maximum mass of leaves can be moved with a minimum expenditure of effort. Capitalizing on this observed phenomenon, the inventor can continuously sweep a clean path through a pile of leaves without any of the backtracking effort required with the common leaf rake.

The inventor also discovered that permitting a slight flexing of the end portions of the blade discourages the tendency of leaves to build up at the end portions of the blade, a build-up which unbalances the load and increases pushing effort. If the blade is made from a flexible polyolefin plastic sheet, such as polyethylene or polypropylene, and reinforced with a stiffening member positioned to permit slight rearward flexing of the ends of the blade, this flexing action coacts with the preferred geometry of the blade to minimize leaf overflow. Because of the novel configuration of the blade, combined with the slight flexing of the ends of the blade, there is little or no tendency for the blade to become off-center overloaded.

When leaves are dry and blowable, the inventive lawn implement complements the wind rake, or blower. Used in conjunction with the wind rake, the subject inventive implement prevents unmanageable build-up of leaf piles. In a typical leaf-working operation, one worker uses the wind rake to continuously work the leaves into a pile, while a second worker with the novel lawn implement breaks the pile down by moving the leaves onto a tarpaulin or onto a curbsite for final disposal.

The inventor has determined that a crew of four workers using his inventive lawn implements can now clear a given surface of fallen leaves in less time than a comparable crew of eight workers using conventional leaf rakes. Furthermore, there is less energy expenditure on the part of the crew of four using the subject implements, which enables the workers to work at a higher productive level with less fatigue.

When leaves are wet and matted, there is a manifold increase of energy required to work those leaves with a leaf rake, as compared to the amount of energy required to work the same quantity of dry leaves. Motor driven blowers are of little or no use in processing wet leaves. Lightweight leaf rakes are of little use in moving the heavy loads of wet leaves. The subject invention works very well with wet leaves.

An ancillary benefit to using the subject device is that the ordinary garden rake in use by professional landscapers usually lasts only a week or so, but used in conjunction with the inventive device, garden rakes now last as long as an entire season, because they are only needed to be used sparingly, and then only for their intended purpose.

To the casual observer, the subject device appears simple, but the inventor experimented with many shapes and sizes of pushing devices before he discovered the unique configuration of his inventive implement. This tool performs immeasurably better than prior art tools employed for the same purpose. Because it requires but four simple parts, it is inexpensive to produce, and it is easy to use and is substantially maintenance free.

OBJECTS OF THE INVENTION

It is, therefore, an object of the invention to provide a lawn implement which will move large piles of leaves across a ground surface more efficiently and with less effort than with a leaf rake.

Another object of the invention is to provide a lawn implement having a handle and a blade wherein the center of axial resistance of the blade is in alignment with the center of axial effort of the implement at the intersection of the handle and the vertical center line of the blade.

Another object of the invention is the provision of a lawn implement for working fallen leaves which does not become off-center when loaded, thereby causing the implement to drift from the intended direction of movement.

Another object of the invention is the provision of a lawn implement for working fallen leaves which does not require extra energy to keep the implement on an intended straight line path in addition to the energy required to move the implement along said path.

It is another object of the invention to provide a lawn implement which substantially eliminates the reliance on arm and chest muscles normally required in leaf-raking work.

It is yet another object of the invention to provide a lawn implement which utilizes the leg muscles and upper body strength and weight of a worker.

It is still another object of the invention to provide a lawn implement which comprises a blade for movement along a ground surface and a handle to push the blade along the ground surface.

It is still another object of the invention to provide a lawn implement comprising a blade and pushing handle in which the blade is designed to maximize the leaf pushing efficiency of the implement.

Yet another object of the invention is to provide a lawn implement which is particularly efficient in working wet, matted leaves.

Still another object of the invention is to provide a lawn implement which may be co-actively and simultaneously used with other implements to clear areas of ground surface.

It is still another object of the invention to provide a lawn implement which is simple in design, rugged, inexpensive to make, easy to use, and free from maintenance.

The foregoing and other objects, features, and advantages of the invention will become apparent from the description of the invention set forth hereinafter when considered in conjunction with the accompanying drawings.

BRIEF DESCRIPTION OF THE DRAWINGS

FIG. 1 is a frontal perspective view of the invention;

FIG. 2 is a perspective view of the invention from the rear and to one side;

FIG. 3 is a front elevational view of the invention;

FIG. 4 is a rear elevational view of the invention;

FIG. 5 is a side elevational view of the invention;

FIG. 6 is a fragmentary top view of the invention;

DETAILED DESCRIPTION OF PREFERRED EMBODIMENTS OF THE INVENTION

Figure 7:
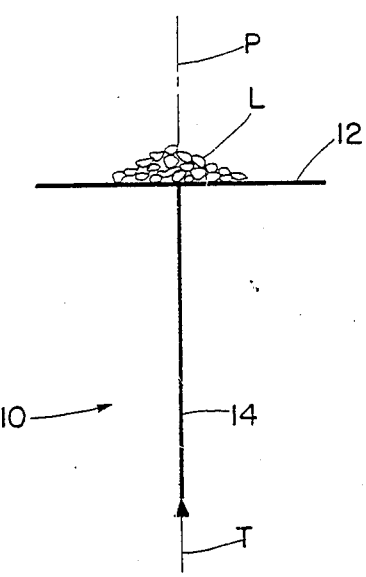
FIG. 7 is a schematic sketch of the inventive yard implement under load conditions.

Referring now to the figures in greater detail, and in particular to FIG. 2, therein is shown the inventive yard implement 10 comprising a blade 12 and a pushing handle 14, secured to the midpoint of a blade stiffening bar 16. Reinforcing gusset plate 36, FIGS. 4, 5, and 6, is not shown in FIG. 2 in order to more clearly illustrate the location of the connection of handle 14 and stiffening bar 16. The handle 14 and the stiffening bar 16 are made from hollow 1" square steel bar stock. The lower end 18 of the handle is welded to the stiffening member 16 at a vertical angle A, FIG. 5, of approximately 35°. The stiffening bar 16 is secured to the blade 12 with threaded fasteners 44. As best shown in FIG. 6, the connection of the handle 14 to the stiffening bar 16 is reinforced by gusset plate 36 welded to the handle 14 and to the stiffening bar 16 along the lines 38, 40, and 42. The ends 20 and 22 of the blade 12, FIG. 3, are substantially one-half of the vertical height of the intersection 24 of the top edges 26 and 28, measured from the horizontal bottom edge 30. The vertical height of the midsection of the blade is substantially one-quarter to one-third of the horizontal length of the bottom edge 30 of the blade 12.

Referring to FIG. 7, therein is schematically shown the inventive implement 10 with the blade 12 center loaded with leaf load L in accordance with the inventive concept. The intended path of the blade is shown at P, and the thrust T is along path P. No other energy expenditure is required to move leaves along path P.

Figure 8:
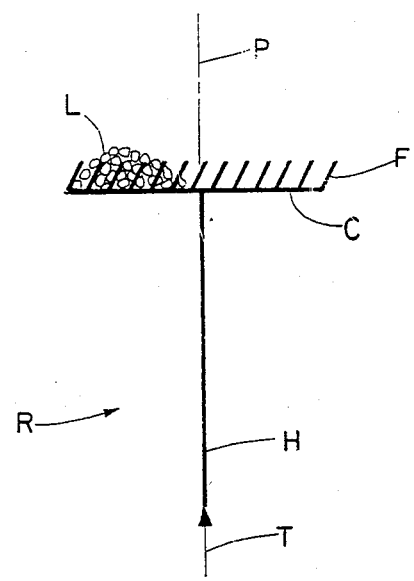
FIG. 8 is a schematic sketch of a prior art professional grading rake inverted and in an off-center overload condition.
Figure 9:
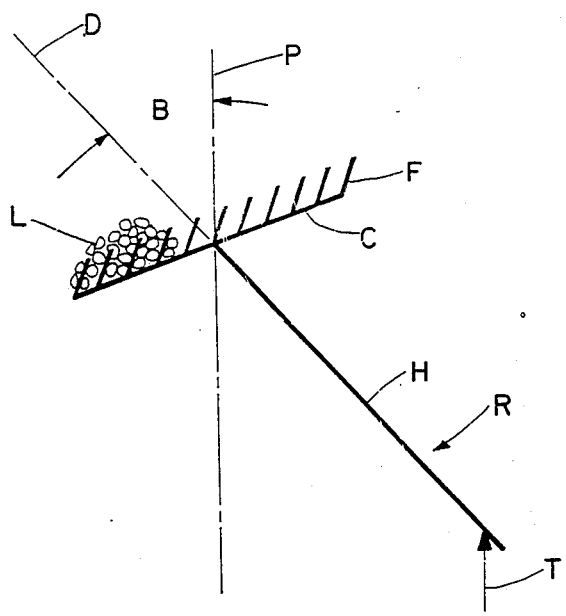
FIG. 9 is a schematic sketch of the prior art professional grading rake of FIG. 8, showing the effect of off-center overload.
Figure 10:
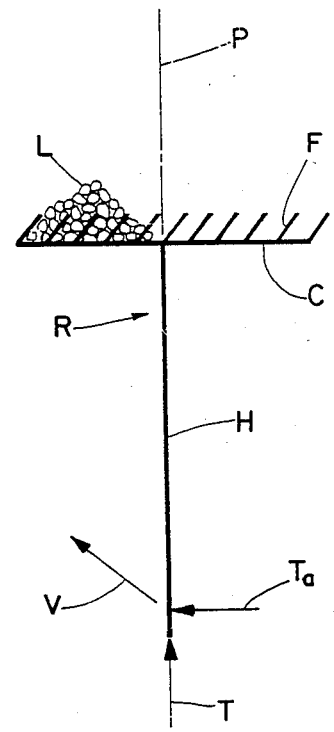
FIG. 10 is a schematic sketch of the prior art professional grading rake of FIG. 8, showing the vector resolution of forces required to move the rake along a predetermined path.

FIG. 8 schematically illustrates an off-center overload of leaves with an inverted prior art professional grading rake R having a handle H and a cross member C of tine fingers F upstanding therefrom. When a thrust T is applied to handle H of rake R along path P, as shown in FIG. 9, the cross member C begins to pivot about lead load L, thereby causing a force vector resolution of thrust T. The resultant thrust vector is along a divergent path D, defined by the angle B formed by paths P and D. To overcome the off-center overload of leaves L, as shown in FIG. 10, it is not only necessary to apply thrust T, but an additional auxiliary thrust Ta must also be applied, resulting in a thrust vector resolution V. Thus, in order to maintain the rake R moving along path P, it is actually necessary to exert a thrust along vector line V. The additional effort required to keep rake R moving along path P is an inefficient waste of energy which eventually takes its toll on the worker. The subject invention has solved the problem of off-center overload, not only in theory, but in commercial reduction to practice.

It will be understood that the above-described embodiment of the invention is for the purpose of illustration only. Additional embodiments, modifications, and improvements can be readily anticipated by those skilled in the art based on a reading and study of the present disclosure. Such additional embodiments, modifications, and improvements may be fairly presumed to be within the spirit, scope, and purview of the invention as defined by the subtended claims.

What is claimed:

1. A lawn implement for working fallen leaves comprising: a blade having a front planar surface, a mid-portion, end portions, a bottom edge and a top edge; a center of maximum resistance and a center of maximum effort; and a handle secured to the back surface of said blade substantially midway between said bottom and top edges and forming a compound angle with said blade when said bottom edge of said blade is in the horizontal position and said blade is in the vertical position, comprising a right angle with the blade when viewed horizontally and comprising an acute angle with said blade when viewed vertically, to facilitate manual pushing of said blade with said handle against fallen leaves; said mid-portion of said blade being adapted to be the center of maximum resistance; the center of maximum effort of said blade being in alignment with said center of maximum resistance; said handle being axially aligned with both of said centers; said blade comprising a straight horizontal bottom edge; vertical left and right outboard side edges of equal length; a left top edge extending from said left outboard edge inwardly and upwardly toward the center of said blade; and a right top edge extending from said right outward edge inwardly and upwardly toward the center of said blade to intersect said left top edge at the vertical centerline of said blade, whereby a pile of leaves may be moved by said blade.

2. The lawn implement of claim 1, said blade being configured to accumulate a greater mass of leaves at its mid-portion than at its end portions, wherein said blade is wider at its mid-portion than at its end portions whereby a greater mass of leaves can accumulate at said mid-portion than at said end portions, and wherein said handle is secured to said mid-portion whereby a thrust applied along the axis of said handle toward said blade maximizes the thrust at the portion of said blade of maximum resistance.

3. The lawn implement of claim 1 wherein, when in use, said blade is maintained substantially vertical by the acute vertical angle of said handle with said blade.

4. The lawn implement of claim 3 wherein the vertical height of said blade from the horizontal bottom edge to the intersection of said left and right top edges is substantially two times the vertical height of said left and right outboard edges from said horizontal bottom edge.

5. The lawn implement of claim 4 wherein said maximum vertical height of said blade at its vertical center line is substantially one-fourth to one-third of the length of said horizontal bottom edge.

6. The lawn implement of claim 4 including longitudinal means to stiffen the center portion of said blade against flexing, while permitting flexing of the outboard ends of said blade.

7. The lawn implement of claim 4 wherein said blade is made of a polyolefin plastic sheet; the thickness of said blade is substantially within the range of one-quarter inch to one-half inch; the maximum height of said blade at its vertical centerline is within the range of 9 to 16 inches when the horizontal length of said blade is within the range of 36 to 48 inches; and the maximum height of said blade at its vertical centerline is substantially 12 inches and the longitudinal length of the blade is substantially 42 inches.

8. The lawn implement of claim 7 wherein the thickness of said blade is substantially within the range of one-quarter inch to one-half inch.

9. The lawn implement of claim 7 wherein the maximum height of said blade at its vertical centerline is within the range of 9 to 16 inches when the horizontal length of said blade is within the range of 36 to 48 inches.

10. The lawn implement of claim 7 wherein the maximum height of said blade at its vertical centerline is substantially 12 inches and the longitudinal length of the blade is substantially 42 inches.

11. The lawn implement of claim 1 wherein said blade is so proportioned that the height of the blade at its mid-portion is substantially twice the height of the outboard ends and substantially thirty percent of the length of the horizontal bottom edge, whereby said blade proportions render said center of maximum resistance self-aligning with said center of maximum effort.

* * * * *